US005721897A

United States Patent [19]

Rubinstein

[11] Patent Number: 5,721,897
[45] Date of Patent: Feb. 24, 1998

[54] BROWSE BY PROMPTED KEYWORD PHRASES WITH AN IMPROVED USER INTERFACE

[76] Inventor: Seymour I. Rubinstein, 337 Belvedere Ave., Belvedere, Calif. 94920

[21] Appl. No.: 687,656

[22] Filed: Jul. 26, 1996

Related U.S. Application Data

[63] Continuation-in-part of Ser. No. 628,098, Apr. 9, 1996.

[51] Int. Cl.$^6$ .................................................. G06F 17/30
[52] U.S. Cl. ........................... 395/602; 395/603; 395/604
[58] Field of Search .................................... 345/602, 603, 345/604

[56] References Cited

U.S. PATENT DOCUMENTS

| 5,278,980 | 1/1994 | Pedersen et al. | 395/604 |
| 5,537,586 | 7/1996 | Amram et al. | 395/603 |
| 5,634,121 | 5/1997 | Tracz et al. | 395/602 |

OTHER PUBLICATIONS

"Anchor Page: An Overview", Anchor Page Users Guide, Oct. 25, 1995, URL http//www.iconovex.com/ANCHOR/USERGUIDE/OVER.HTM.
"Indexicon Indexes Documents Quickly", David Haskins, PC Magazine, Sep. 13, 1994, p. 48.
"Anchor Page For Windows 95/NT is Now Shipping", Iconovex Press Release, Oct. 20, 1995, URL http://www.Iconovex.com/ANCHOR/PRESS.HTM.
"Automatic Indexing And Abstracts", Windows Magazine, May 1, 1995, Issue No. 0.
"Anchor's Away for Web Docs", James E. Powell, Windows Magazine, Dec. 1, 1995, Issue No. 614.
"Iconovex Ships Tool For Web Pages", Interactive Age Magazine, Apr. 24, 1995, CMP Media, Inc.
"Indexicon Logo SPEC Sheet", Downloaded from URL, http://www.iconovex.com/INDEX.HTM, prior to Apr. 1, 1996.

*Primary Examiner*—Paul R. Lintz
*Attorney, Agent, or Firm*—Blakely, Sokoloff, Taylor & Zafman

[57] ABSTRACT

An apparatus and method for identifying one of a plurality of documents stored in a computer-readable medium is disclosed. The method includes the steps of automatically identifying for a user key word phrases in the plurality of documents, prompting the user to construct a query expression in which at least one of the keyword phrases is an operand, and identifying one of the plurality of documents based on the query expression. The identified document is presented to the user in the form of an abstract. Identification of the keyword phrases and generation of the abstract are accomplished by linguistically analyzing the plurality of documents. In addition, an improved user interface provides the capability to display either or both key words and key phrases on the display screen in separately scrollable display areas. These separately scrollable display areas are dynamically sized to render visible the selected text. A set of dynamically created tabs in a tabbed index provide a means to index into the content of each display area. The font of the selected and displayed text is dynamically set to maximize the display area. The plurality of documents from which key words or key phrases are taken may be pages from the World Wide Web. A concept editor allows key words or key phrases to be grouped under a concept identifier.

21 Claims, 7 Drawing Sheets

Files that include this: — 34C

- dog: security
- watch dog
- guard dog
- police dog
- doberman
- german shephard

342

But not this:

- pit bull

BROWSE BY PROMPTED KEYWORD PHRASES WITH AN IMPROVED USER INTERFACE

RELATED CASE

This is a continuation-in-part patent application from parent co-pending application Ser. No. 08/628,098, filed Apr. 9, 1996, pending and invented by Seymour I. Rubinstein.

BACKGROUND OF THE INVENTION

1. Field of the Invention

The present invention relates to the field of computerized document management. More specifically, the present invention relates to a method and apparatus for identifying one of a plurality of documents by permitting a computer user to browse the documents by prompted keyword phrases using an improved user interface.

2. Art Background

In modern computer application programs, such as commercially available word processor programs, a user choosing to open a data file is typically provided with a list of data files contained in the active directory or folder and prompted to select one. The process of selecting a data file varies based on the user's foreknowledge of the data file sought, and generally falls into one of four cases. First, if the user knows the name of the file sought and the filename is listed, the user simply selects that file. Second, if the user does not know the filename but knows the general nature of the subject matter sought, the user may still be able to select the file of interest on the basis of its filename. In this case, the user may have to open several files having filenames related to the subject of interest before opening a satisfactory file. If, in a third case, the user doesn't know the name of the file sought or even the general nature of the subject matter sought, but seeks a file referencing or discussing a specific word or phrase, the user may need to open each of the files in turn and perform either a manual or automated search for the "keyword phrase" of interest. File by file search for keyword phrases can be time consuming and tedious, particularly if there are a large number of files. In most instances, consequently, the search for keyword phrases within files can be automated either by application program or by operating system utility (the former being exemplified by search features commonly provided by word processors, the latter by the UNIX grep utility). In the fourth and final case, if the user doesn't know the filename, subject matter or even keyword phrases sought, but simply wishes to browse the documents until something of interest appears, the user must do this on a file by file basis.

It would be desirable to allow the user to browse data files within the active folder by abstracting the essential concepts of the data files and presenting them to the user in the form of an abstract. Furthermore, it would be desirable to relieve the user of the burden of conceiving search terms by automatically identifying keyword phrases in the data files and presenting them to the user at the time the user seeks to identify a file. The user could then select one or more of the keyword phrases, join them in a logical expression and allow the computer to identify the file or files most nearly satisfying the logical expression of keyword phrases. These and other benefits are achieved by the method and apparatus of the present invention.

SUMMARY OF THE INVENTION

A method and apparatus for identifying one of a plurality of documents stored in a computer-readable medium are disclosed. The method allows a computer user to browse the plurality of documents by prompting the user to construct a query expression from an automatically generated list of keyword phrases. Once selected by the user, the query expression is used to identify one of the plurality of documents and an abstract of the identified document is presented to the user. Identification of the keyword phrases and generation of the abstract is performed by linguistically analyzing the documents. The method of the present invention includes the steps of automatically identifying for a user keyword phrases in the plurality of documents, prompting the user to construct a query expression in which at least one of the keyword phrases is an operand, and identifying one of the plurality of documents based on the query expression.

In addition, an improved user interface provides the capability to display either or both key words and key phrases on the display screen in separately scrollable display areas. These separately scrollable display areas are dynamically sized to render visible the selected text. A set of dynamically created tabs in a tabbed index provide a means to index into the content of each display area. The font of the selected and displayed text is dynamically set to maximize the display area. The plurality of documents from which key words or key phrases are taken may be pages from the World Wide Web. A concept editor allows key words or key phrases to be grouped under a concept identifier and used in document search queries.

A method and apparatus is disclosed for identifying one of a plurality of documents stored in a computer-readable medium, the method comprising the computer-implemented steps of: 1) automatically identifying for a user keyword phrases in the plurality of documents; 2) displaying a tabbed index indicative of content of the keyword phrases; 3) prompting the user to construct a query expression in which at least one of the keyword phrases is an operand; and 4) identifying one of the plurality of documents based on the query expression.

BRIEF DESCRIPTION OF THE DRAWINGS

The features and advantages of the present invention will be more fully understood by reference to the accompanying drawings, in which.

DETAILED DESCRIPTION OF THE INVENTION

In the following detailed description of the present invention numerous specific details are set forth in order to provide a thorough understanding of the present invention. However, it will be obvious to one skilled in the art that the present invention may be practiced without these specific details.

Overview of a Method According to the Present Invention

Figure 1:
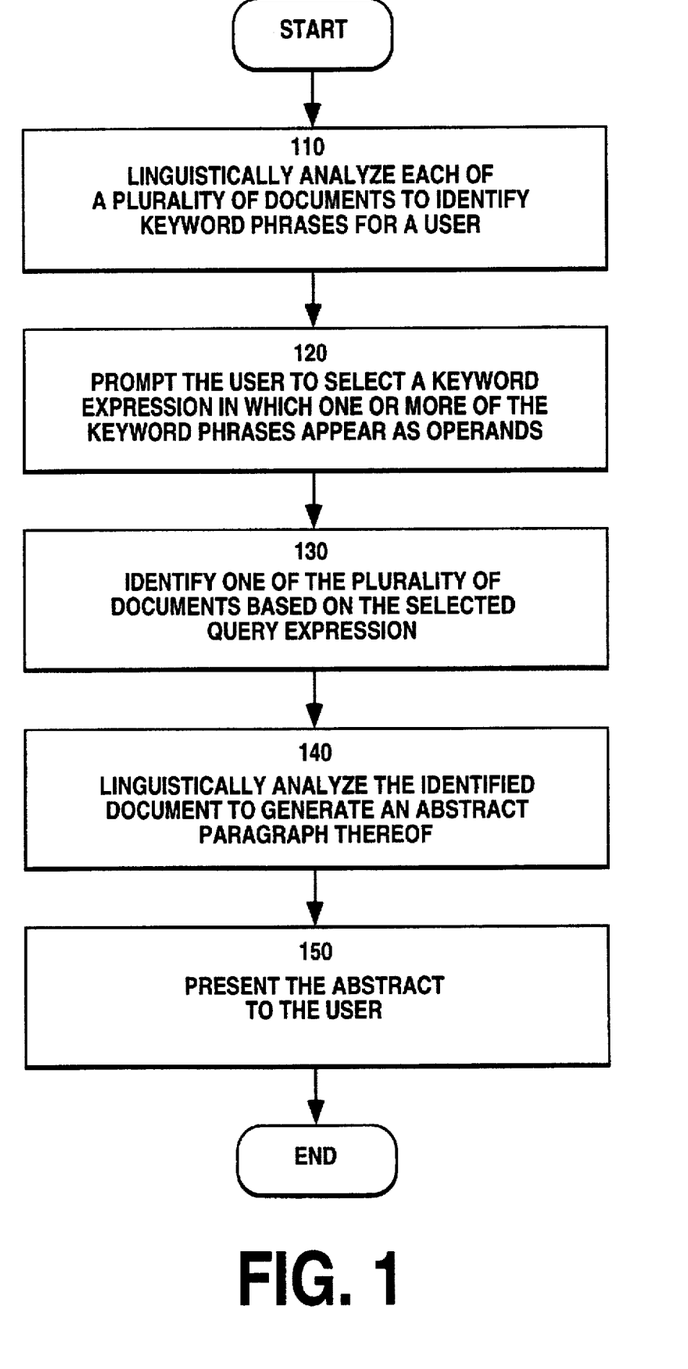
FIG. 1 illustrates a method according to the present invention.

FIG. 1 illustrates a method for identifying one of a plurality of documents stored in a computer-readable medium by prompting a computer user (typically a human operator) to construct a query expression from an automatically generated list of keyword phrases. Herein the term document refers to a computer-readable arrangement of data and includes ASCII and other character based files as well as binary files having a format interpretable by an application program. In the present invention, these documents may be locally resident files or pages on the World Wide Web (WWW). The web pages are stored at web sites on the WWW and accessible using a Universal Resource Locator (URL).

At step 110, each of the plurality of documents is linguistically analyzed to identify keyword phrases therein, and the identified keyword phrases are presented to the user. A keyword phrase is a word or group of words expressing a significant concept, and a document is said to contain a keyword phrase if the keyword phrase literally appears in the document or its basis for derivation appears in the document. For example, a document containing the phrase "clothing that is machine washable" contains the keyword phrase "machine washable clothing" because, even though "machine washable clothing" does not appear literally in the document, the basis for deriving the keyword phrase does. Linguistic analysis and identification of keyword phrases is discussed further below. At step 120, the user is prompted to construct a query expression by selecting keyword phrases from the presented set of keyword phrases. A query expression is a logical expression in which one or more keyword phrases appear as operands. At step 130, one or more of the plurality of documents is identified based on the constructed query expression. For example, if the plurality of documents consists of the set (A, B, C, D, E) and the query expression is: keyword phrase 1 AND keyword phrase 2 AND NOT keyword phrase 3, then the document from the set (A, B, C, D, E) satisfying or most nearly satisfying the query expression (i.e., containing keyword phrase 1 and keyword phrase 2, but not containing keyword phrase 3), will be identified by step 130. At step 140, an abstract of the document is generated, and at step 150 the document abstract is presented to the user. As will be discussed further below, the document abstract is obtained by linguistic analysis of the identified document to identify concept sentences. Concept sentences are sentences containing keyword phrases. Finally, the identified concept sentences are combined to generate the document abstract.

Preferred Embodiment of the User-Interface

Figure 2:
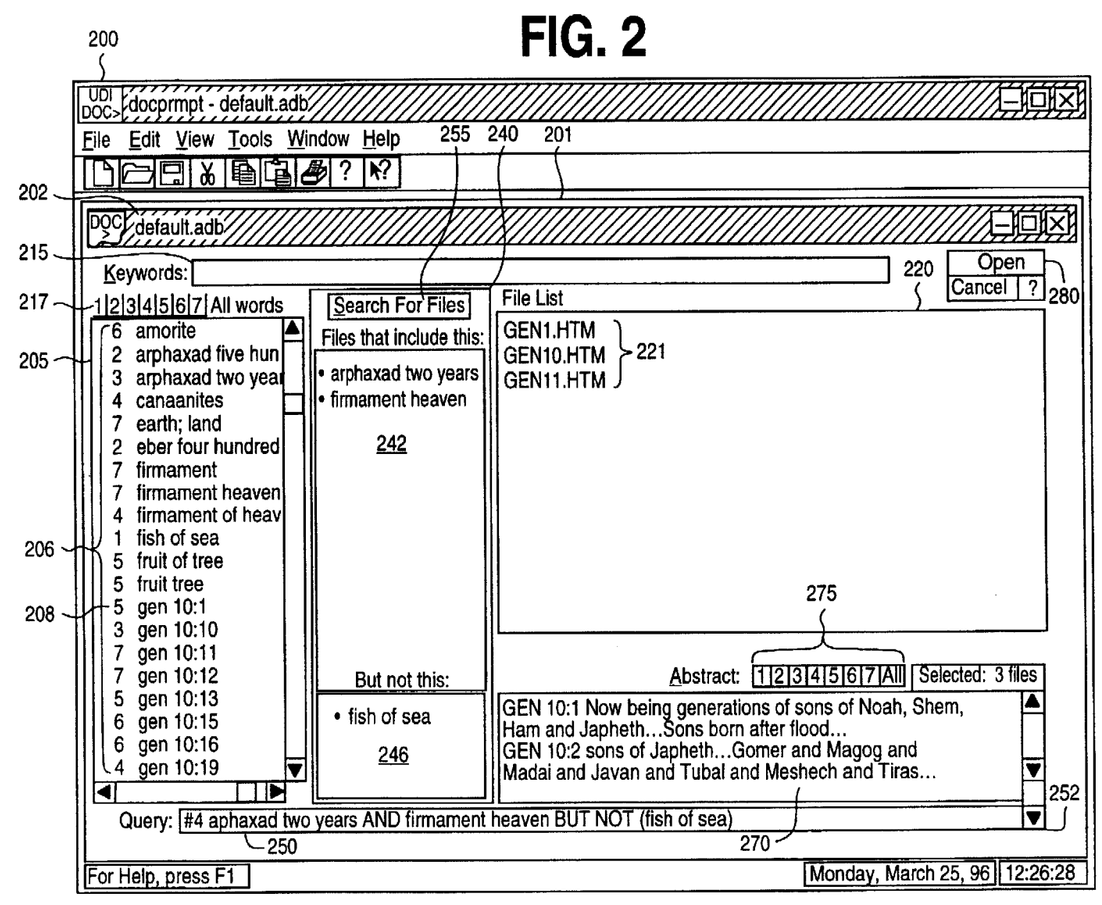
FIG. 2 depicts the preferred embodiment of a user-interface according to the present invention.

FIG. 2 depicts a user-interface 200 allowing a computer user to identify one of a plurality of documents in accordance with the method described above. The user-interface 200 is presented to the user in response to a document select request such as a request to open a data file in a word processing or other text-intensive application. The user may not know a priori the specific document or even the subject matter he or she seeks. In the present invention, therefore, the user-interface 200 includes a dialog box 201 that presents an automatically generated list of search terms, referred to as keyword phrases, in a keyword pane 205. The listed keyword phrases 206 act to "prompt" the user to search for information of interest without requiring the user to conceive search terms. Thus, the present invention relieves the user from the burden of creating a document search expression, and instead permits the user to browse the relevant documents on the basis of the automatically generated keyword phrases 206. Keyword entry pane 215 is provided to allow the user to enter keyword phrases that do not appear in the keyword pane 205. The keyword phrases 206 listed in the keyword pane 205 prompt the user to construct a query expression which will be used to identify one of the plurality of documents. Beside each keyword phrase presented in keyword pane 205 is the relevance code 208 of the keyword phrase. Relevance codes 208 are values indicating the importance of the keyword phrase relative to other keyword phrases in the document. As stated above, the keyword phrases are obtained by linguistically analyzing each of a plurality of documents, and, in the preferred embodiment, relevance codes are generated by the linguistic analysis. Linguistic analysis and the relevance codes resulting therefrom are discussed in greater detail below.

Dialog box 201 includes a file list pane 220 listing the documents 221 to be searched. The documents to be searched are drawn from an archive catalog; an arbitrary collection of documents that constitute a single searchable entity. The archive catalog open at any given time is the archive catalog from which the keyword phrases 206 in keyword pane 205 are drawn and the name of the open archive catalog appears in the title bar 202 of dialog box 201. In the preferred embodiment, the computer user may construct and save archive catalogs by selecting documents from a list of documents presented by the computer operating system or its extensions (e.g., the Apple Macintosh Finder or the Microsoft Windows '95 Explorer). Alternatively, archive catalogs can be created automatically from the group of documents residing in an identified area of a computer system's file storage such as a folder or directory. When constructed, an archive catalog becomes the open archive catalog and each of the documents therein appear in file list pane 220. The user may also recall previously constructed archive catalogs. For archive catalogs containing more documents than can be presented in the file list pane 220 at once, the file list pane 220 operates as a virtual window to the complete list of documents and scrollbars allow the user to select the viewpoint of the virtual window at points of interest along the complete list of documents.

Dialog box 201 also includes a search pane 240 which itself contains constituent logic panes 242 and 246. Logic panes 242 and 246 are logical operation elements; graphic constructs that represent logical operators. Search pane 240 prompts the user to construct a query expression by associating keyword phrases 206 with logical operation elements. In the preferred embodiment, this is accomplished by dragging one or more keyword phrases 206 from keyword pane 205 and dropping each into one of the logic panes 242 or 246 (the physical act of moving a displayed object from one location to another is a well known operation performed with a cursor control device such as a mouse or trackball and is referred to as a "drag and drop" operation). As stated above, a query expression is a logical expression in which one or more keyword phrases appear as operands. The act of dropping a selected keyword phrase into one of the two logic panes (242 or 246) within search pane 240 causes the keyword phrase to be logically joined to the query expression. The nature of the logical join is determined by the logic pane (242 or 246) into which the keyword phrase is dropped. Logic pane 242 is referred to as the "INCLUDE" logic pane and keyword phrases dropped therein are initially joined to the query expression by a logical AND operator. When joined to the query expression by a logical AND operator, a keyword phrase must be contained by the document sought in addition to the previously formulated query expression. The phrase "previously formulated query expression" is used herein to refer to the query expression as it exists prior to a drag and drop event and, if no prior drag and drop events have occurred, the previously formulated query expression may consist of an empty set of keyword phrases. In the preferred embodiment, the logical AND operator joining a keyword phrase dropped in the INCLUDE logic pane 242 to the query expression may be converted to a logical OR operator by placing the mouse cursor over the keyword phrase and depressing the right mouse button. A menu will be presented with a selection allowing the logical operator to be toggled between AND and OR. As will be discussed further below in reference to FIG. 3, each keyword phrase joined to the query expression by a logical OR operator is associated with the nearest preceding keyword expression joined to the query expression by a logical AND operator. Search pane 240 also includes "NOT" logic pane 246 for specifying query expressions that are not to appear in the document sought.

In the preferred embodiment, the query expression is displayed in query pane 250 as each of its constituent keyword phrases is selected. Query pane 250 enables the user to type a query expression or to edit a query expression previously constructed via the drag and drop technique described above. In this way, complex query expressions may be specified which might be difficult or awkward to construct using the drag and drop technique alone. Further, query pane 250 includes a down arrow 252, which, when selected by the user presents a history of prior query expressions that may be recalled.

Figure 3:
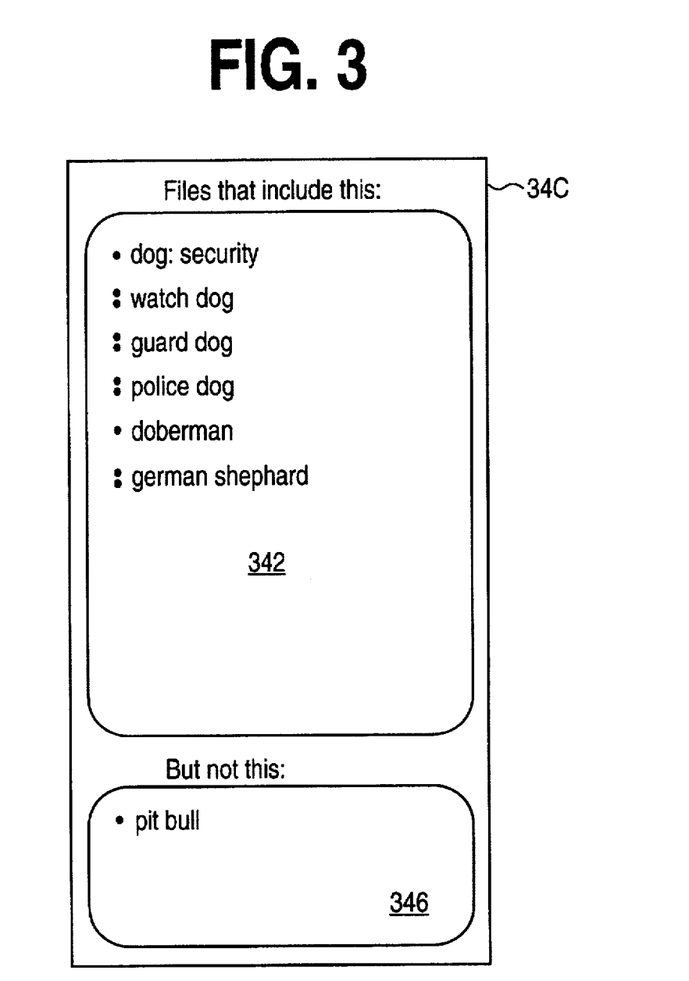
FIG. 3 depicts a search pane used to construct a query expression.
Figure 4:
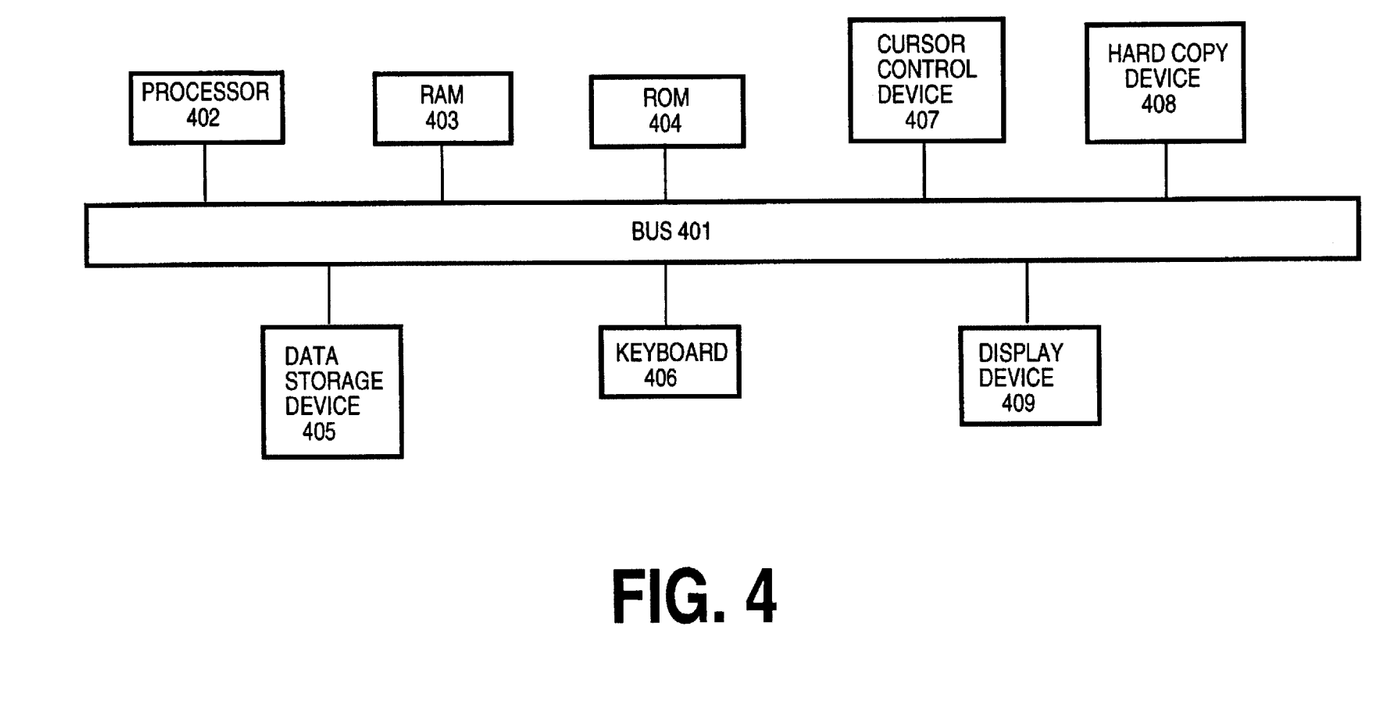
FIG. 4 illustrates a general purpose computer utilized to perform the method steps of the present invention.

FIG. 3 depicts a search pane containing an exemplary query expression constructed using the interface of the preferred embodiment. The query expression "(dog:security OR watchdog OR guard dog OR police dog) and (doberman or german shepherd) AND NOT (pit bull)" may be constructed from a keyword phrase list containing the query expression's constituent keyword phrases as follows: First, the constituent keyword phrases are selected from the list of keyword phrases (not shown) and dropped into INCLUDE logic pane 342 beginning with keyword phrase "dog:security" and ending with keyword phrase "german shepherd". A this point the query pane (not shown) will contain the query expression "dog:security AND watchdog AND guard dog AND police dog AND doberman AND german shepherd". By converting the logical AND operators corresponding to the keyword phrases "watchdog", "guard dog", "police dog" and "german shepherd" to logical OR operators (using the technique described above in reference to FIG. 2), the query expression "(dog:security OR watchdog OR guard dog OR police dog) AND (doberman OR german shepherd)" is obtained. Since a logical OR operator associates a keyword phrase to the nearest preceding keyword phrase joined to the query expression by a logical AND operator, keyword phrases "watchdog", "guard dog" and "police dog" are logically OR'd with the keyword phrase "dog:security" and keyword phrase "german shepherd" is logically OR'd with the keyword phrase "doberman". A single dot adjacent a keyword phrase appearing in INCLUDE logic pane 342 indicates that the keyword phrase is joined to the query expression by a logical AND operator, while two dots adjacent a keyword phrase indicate that the keyword phrase is joined to the query expression by a logical OR operator. Thus, of the keyword phrases dropped in logic pane 342, "dog:security" and "doberman" have a single dot adjacent them while the others have two dots adjacent them. After dropping the keyword phrase "pit bull" in the NOT logic pane 346, the desired query expression is completed. To change the logical relationships between the selected keyword phrases, the keyword phrases may be dragged and dropped in different positions within search pane 340. For example to logically OR "german shepherd" with "dog:security" instead of with "doberman", the keyword phrase "german shepherd" may be dragged and dropped to a position preceding (above) "doberman".

In the preferred embodiment it is also possible to group keyword phrases under "concept headings". Concept headings are keyword phrases which serve as a shorthand expression for each of the keyword phrases associated with them. Thus, when a concept heading 'X' having constituent keyword phrases 'A', 'B' and 'C' is dropped into the INCLUDE logic pane, keyword phrases 'A', 'B' and 'C' become part of the query expression (though, in the preferred embodiment, only the concept heading 'X' appears in the query pane). Furthermore, the logical association of keyword phrases that have been grouped under a concept heading dropped in the INCLUDE logic pane may be specified. For example, by repositioning the constituent keyword phrases relative to one another and by toggling between logical AND and logical OR operators, keyword phrases 'A', 'B' and 'C' may be related by: (A OR B) AND C; A AND (B OR C); and so on. Concept headings may be entered by the user or selected from the automatically generated list of keyword phrases.

Returning to FIG. 2, in the preferred embodiment, once a query expression is completely constructed, the user initiates a document search by placing the mouse cursor over Search button 255 and pressing a mouse button (i.e., clicking the Search button 255). After the search, the list of documents appearing in file list pane 220 is reduced to the subset of documents meeting the search criteria set forth in the query expression. Alternative embodiments, including one in which all of the documents remained in view, but with the subset of documents meeting the query expression indicated in some way (e.g., by highlighting or shading), would be within the spirit and scope of the present invention.

The document abstract pane 270 is used to present an abstract from a document identified based on the query expression constructed by the user. The identified document is a document meeting the logical criteria set forth in the query expression. In the example above, for instance, a document having keyword phrases A and B, but not E would be identified, as would a document having keyword phrase D, but not E. An abstract of the identified document is generated by first performing linguistic analysis on the document to identify concept sentences and then combining the concept sentences. Note that the linguistic analysis performed to identify concept sentences may be the same as that used to identify keyword phrases. In the preferred embodiment, the user may select the document from which the abstract is generated by clicking on any one of the documents 221 listed in file list pane 220. In this way, a user can browse the abstract of each document identified by the query expression. In an alternative embodiment, an abstract from one of the identified documents could be presented automatically upon completion of a search for documents meeting the query expression. In any case, the document from which the abstract presented in abstract pane 270 is drawn may be opened by clicking the Open button 280.

In the preferred embodiment, the user is permitted to create multiple instances of dialog box 201, each presenting a list of keyword phrases, a list of documents and an abstract based on the same or different archive catalog as used to present dialog box 201. Also, several of the panes within dialog box 201, including the keyword pane 205, file list pane 220, search pane 240 and abstract pane 270, are resizeable to permit more or less information to be presented therein.

Linguistic Analysis

In the preferred embodiment of the present invention a commercially available linguistic analysis tool named Syntactica from Iconovex Corporation is used to linguistically analyze documents. Other linguistic analysis tools, including tools from Inference Corporation and others, may also be used. Linguistic analysis tools fall generally into one of two categories: referential analyzers and mathematical analyzers.

Referential analyzers, including Syntactica, perform paragraph by paragraph parsing of documents using dictionary definitions of words to identify grammatically and definitionally significant phrases (i.e., keyword phrases). Grammatically significant phrases are identified on the bases of syntactic analysis, in which syntactically necessary, but conceptually insignificant terms (such as conjunctions, articles, etc.) are removed. Identification of definitionally significant phrases is termed semantic analysis and involves reference to the dictionary definition of the terms constituting the phrase. Based on their grammatical and definitional significance relative to one another, the keyword phrases are assigned relevance codes. Syntactica, for example, assigns relevance codes from 1 through 6 to identified keyword phrases with 6 indicating highest relevance. In the preferred embodiment of the present invention, these relevance codes are listed along with the keyword phrases to which they refer.

Referring to FIG. 2, the number of keyword phrases presented in the keyword pane 205 may be controlled by filtering the keyword phrases presented based on relevance code. Relevance rank selection buttons 217 are provided for this purpose. Clicking on the relevance rank selection button numbered "6", for example, results in the presentation of a highly selective and therefore reduced number of keyword phrases, each having a relevance code of 6. Clicking on the relevance rank selection button numbered "1", by contrast, results in a less selective, more extensive listing of keyword phrases having relevance codes of 1 or greater.

Based on the same linguistic analysis described above, Syntactica identifies concept sentences. Concept sentences are sentences containing keyword phrases. As with keyword phrases themselves, the selectivity with which concept sentences are defined may be controlled by user selection of a relevance filter by clicking a desired one of the abstract relevance rank selection buttons 275. By combining the identified concept sentences, an abstract of the document may be obtained.

Mathematical analyzers perform linguistic analysis by measuring the relative frequency of occurrence of words after they have been converted to stemmed words. A stemmed word is one which has been reduced to its root form by removing inflectional elements and otherwise truncating declensional and conjugative forms of the words (for example, reducing "shipped" to "ship", "devices" to "device" or "president's" to "president"). Those stemmed words or groups of stemmed words having a relatively high frequency of occurrence (i.e., high frequency of occurrence compared to other stemmed words), are considered to be keyword phrases. Relevance codes can be assigned to the stemmed words based on their relative frequency of occurrence.

Regardless of whether the a referential or mathematical linguistic analyzer is used to parse documents, documents may first need to be converted from a specialized format into a format recognizable by the linguistic analysis tool. In the preferred embodiment, for example, certain types of data files are first converted to the standard file format known as "ASCII Plain Text" (ASCII) before being linguistically analyzed by Syntactica.

Overview Of A Computer System In The Preferred Embodiment

In the preferred embodiment, an apparatus for performing the method steps described above includes the computer system 400 shown in FIG. 3. The present invention may be implemented on a general purpose microcomputer, such as one of the members of the Apple Macintosh family, one of the members of the IBM Personal Computer family, or one of several work-station devices which are presently commercially available. In any event, a computer system as may be utilized by the preferred embodiment generally comprises a bus 401 for communicating information, a processor 402 coupled with said bus 401 for processing information, a random access memory (RAM) or other storage device 403 (commonly referred to as a main memory) coupled with said bus 401 for storing information and instructions for said processor 402, a read only memory (ROM) or other static storage device 404 coupled with said bus 401 for storing static information and instructions for said processor 402, a data storage device 405, such as a magnetic disk and disk drive, coupled with said bus 401 for storing information and instructions, an alphanumeric input device 406 including alphanumeric and other keys coupled to said bus 401 for communicating information and command selections to said processor 402, a cursor control device 407, such as a mouse, track-ball, cursor control keys, etc., coupled to said bus 401 for communicating information and command selections to the processor 402 and for controlling cursor movement, and a display device 409 for receiving display data from the processor 402 and presenting the display data to the computer user. Additionally, it is useful if the system includes a hardcopy device 408, such as a printer, for providing permanent copies of information. The hardcopy device 408 is coupled with the processor 402 through bus 401.

In the preferred embodiment, the individual steps of the method of the present invention are performed by the above described general purpose computer components programmed with instructions that cause the processor 402 to perform the recited steps. However, the steps of the method of the present invention may also be performed by specific hardware components that contain hard-wired logic for performing the recited steps, or any combination of programmed general purpose computer components and custom hardware components. Nothing disclosed herein should be construed as limiting the present invention to a single embodiment wherein the recited steps are performed by a specific combination of hardware components.

Preferred Embodiment of the Improved User-Interface

Figure 5:
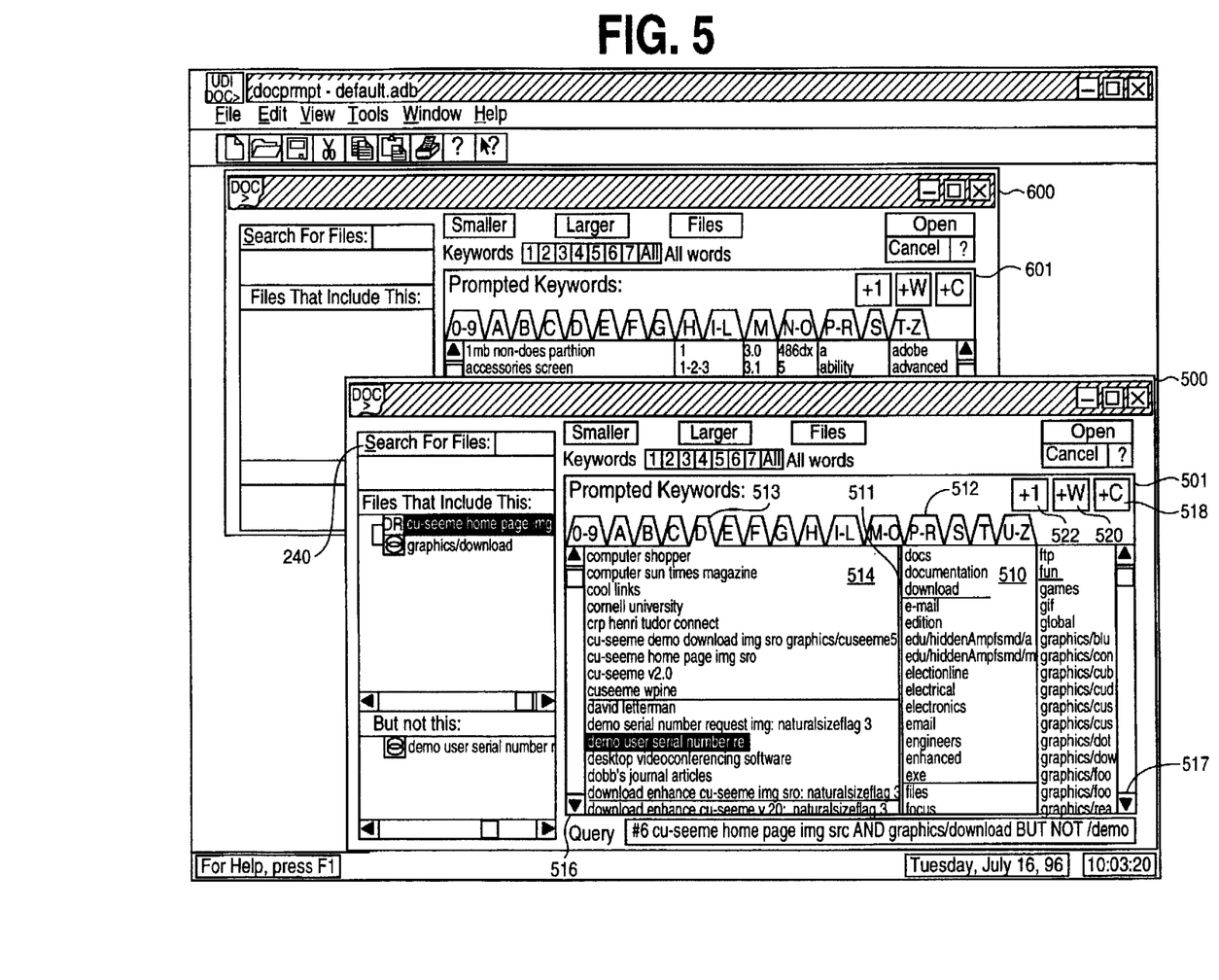
FIG. 5 depicts the preferred embodiment of the improved user-interface showing a keyword and a key phrase window pane with dynamic index tabs.

FIG. 5 depicts an improved user-interface 500 allowing a computer user to identify one of a plurality of documents in accordance with the method described above. The user-interface 500 is presented to the user in response to a document select request such as a request to open a data file in a word processing or other text-intensive application. In the present invention, therefore, the user-interface 500 includes an automatically generated list of search terms, referred to as key words and key phrases, displayed in a keyword pane 501. The present invention improves upon the keyword pane 205 shown in FIG. 2 and described above. In the present invention, keyword pane 501 includes a key phrase area 514, a key word area 510, a tabbed index 512, and buttons 518, 520, and 522 for configuring the display of information in keyword pane 501. The listed key words in key word area 510 and key phrases in key phrase area 514 act to "prompt" the user to search for information of interest without requiring the user to explicitly conceive search terms. Thus, the present invention relieves the user from the burden of creating a document search expression, and instead permits the user to browse the relevant documents on the basis of the automatically generated key words and key phrases. The key words and key phrases listed in areas 510 and 514 prompt the user to construct a query expression via a drag and drop technique which is used to identify selected ones of the plurality of documents. As described above, any of the key words or key phrases shown areas 514 and 510 may be dragged and dropped into search pane 240 shown in FIGS. 2 and 5. Each of the areas 514 and 510 are separately scrollable using conventional vertical scroll bars 516 and 517, respectively.

Each of the areas 510 and 514 are dynamically sized to render visible the selected portion of the key words or key phrases. The areas 510 and 514 are separated by a dynamically placed separator 511. The position of separator 511 varies depending upon whether either or both key words and/or key phrases have been selected for display using buttons 518 and 520. If key words are selected for display in area 510 using button 520, the separator 511 shifts left to enlarge the display area 510 available for the display of key words. An example of this is shown in keyword pane 601 illustrated in FIG. 5. Separator 511 may also be shifted all the way over to the left margin of pane 501 thereby displaying only key words and selectively suppressing the display of key phrases. If key phrases are selected for display in area 514 using button 518, the separator 511 shifts right to enlarge the display area 514 available for the display of key phrases. Separator 511 may also be shifted all the way over to the right margin of pane 501 thereby displaying only key phrases and selectively suppressing the display of key words. The width of each of the areas 510 and 514 is dynamically adjusted based upon the width of the key words or key phrases currently being displayed in these areas. Thus, the text content is used to determine the display area size. Specifically, the width of area 514 is set to the width of the longest key phrase currently being displayed in area 514. An example of this is shown in FIG. 5. Once the width of area 514 is set based upon its content, the width of area 510 may be determined. Given the area 510 left over in keyword pane 501 after the width of area 514 is determined, key words may be displayed in a dynamically-created multi-column format to consume the available area 510. The width of each of the columns in this area is dynamically set to the width of the longest key word currently being displayed in that column. If areas 514 and 510 cannot be dynamically sized wide enough to render visible a long key word or key phrase, horizontal scroll bars are automatically inserted to render area 510 or 514 as a virtual view area into the key word or key phrase data. Additionally, the font of the text displayed in areas 510 and 514 can be dynamically modified to efficiently use the display area provided in these areas given the text content that must be displayed.

Beside each keyword and key phrase presented in areas 510 and 514, a relevance code 208 (shown in FIG. 2) of the keyword or key phrase may be selectively displayed. Button 522 is used to toggle on/off the display of this numerical information. As stated above, the key words and key phrases of the areas 510 and 514 are obtained by linguistically analyzing each of a plurality of documents and, in the preferred embodiment, relevance codes 208 are generated by the linguistic analysis.

Keyword pane 501 includes a tabbed index 512, which is used to select for display the key words or key phrases beginning with the letters or numbers on a corresponding selected tab of tabbed index 512. Referring again to FIG. 5, a tabbed index 512 is shown. Each tab of tabbed index 512 includes an alphanumerical symbol or symbols that correspond to the first letter of key words or key phrases displayable in keyword pane 501. Any one tab of tabbed index 512 may be selected using a conventional pointing device or mouse. Upon selection of a tab, the alphanumerical symbol on the tab is used as a search symbol. The key words and key phrases are searched for the first occurrence of a matching key word or key phrase that begins with the search symbol. If found, the matching key word or key phrase is displayed in area 514 for a matching key phrase and in area 510 for a matching key word. In one embodiment, the matching key word or key phrase is displayed at the top or first line in the area 510 or 514 and subsequent key words or key phrases are filled in beneath the first line. In an alternative embodiment, the matching key word or key phrase is displayed centered at the line in the middle of the area 510 or 514 and previous key words or key phrases are filled in above the matching centered key word or key phrase and subsequent key words or key phrases are filled in beneath the matching centered key word or key phrase. If a tab includes more than one alphanumeric character in a character sequence, the first alphanumeric character in the sequence is used as the search symbol.

In the example shown in FIG. 5, a tab 513 labelled "D" has been selected by a user. In this case, the letter "D" becomes the search character. In response to this selection, the present invention has searched the set of previously generated key words and has displayed the first matching key word beginning with the search symbol "D" in area 510. In this example, the matching key word is displayed in the first line of the area 510. Also in response to the selection, the present invention has searched the set of previously generated key phrases and has displayed the first matching key phrase beginning with the search symbol "D" in middle line of area 514. Other key phrases are filled in around the matching key phrase. In addition, the portion of a line segment displayed underneath the tabbed index 512 at the selected tab 513 is removed to indicate this tab has been previously selected. In areas 514 and 510, horizontal line segments are inserted in the text to mark the transition between groups of key words or key phrases having a common first symbol to a next group of key words to key phrases having a next common first symbol. In the preferred embodiment, the key words and key phrases are sorted alphanumerically.

The alphanumerical symbol or symbols on the tabs of tabbed index 512 are dynamically generated based upon the content of the key words or key phrases they represent. These tab symbols are dynamically generated from the key word and key phrase content in the following manner.

First, the key word and key phrase content is scanned to determine the first alphanumeric character appearing for each key word and key phrase. Next, the total number of key words and key phrases beginning with the same alphanumeric character are tallied for each alphanumeric character. The average number of key words and key phrases beginning with the same alphanumeric character is then computed. Groups of sequential alphanumeric characters are collected such that the total number of key words and key phrases beginning with the alphanumeric characters from the group approaches the average previously computed. In some cases, a single alphanumeric character may have enough key words and key phrases beginning with that alphanumeric character that the total for that alphanumeric character approaches the average previously computed. In other cases, a group of alphanumeric characters must be collected to have enough key words and key phrases beginning with those alphanumeric characters so the total for that group of alphanumeric characters approaches the average previously computed. Once these single alphanumeric characters or groups of alphanumeric characters are determined, the single alphanumeric character symbol or symbols representing the groups of alphanumeric characters are inserted into the tabs of the tabbed index shown by example in FIGS. 5–7.

Figure 6:
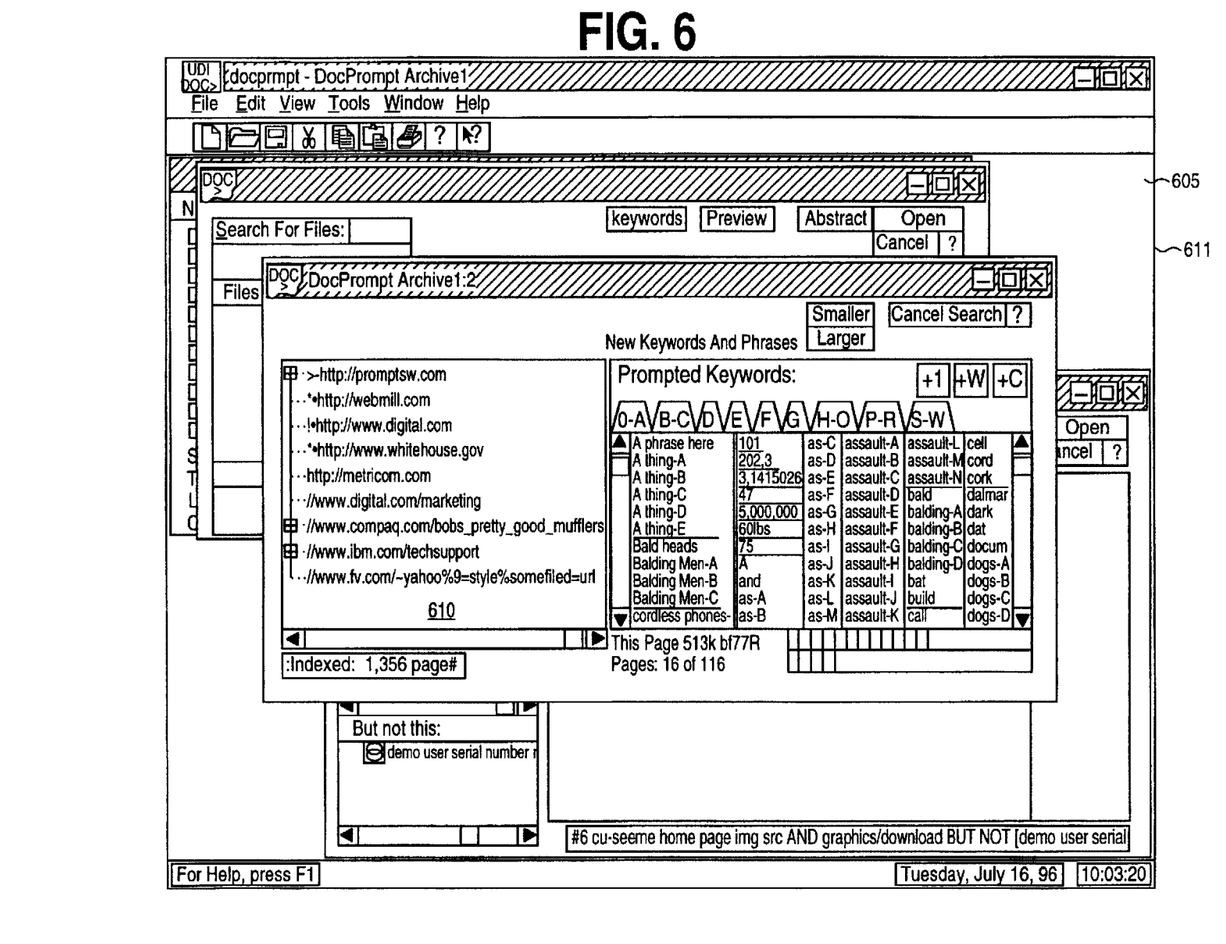
FIG. 6 depicts the preferred embodiment of the improved user-interface showing WWW web pages.

In an alternative embodiment of the present invention, the archive catalog may be a collection of documents residing at arbitrary sites on the World Wide Web (WWW). These documents or pages may be accessed and referenced using their conventional Universal Reference Locator (URL). Referring now to FIG. 6, a web page list 610 is included in window 605. Web page list 610 includes a URL for each of the WWW resident documents in the archive catalog for the present invention. In the manner described above, the key words and key phrases of the areas 510 and 514 are obtained by linguistically analyzing each of the plurality of documents from the archive catalog. In this alternative embodiment, these documents are web pages identified in web page list 610. In a manner similar to the linguistic analysis performed on locally resident files, the web pages are scanned for key words and key phrases. These Web resident key words and key phrases are then displayed in prompted keyword pane 611. The keyword pane 611 operates in the same way as keyword pane 501 described above in connection with FIG. 5.

The URLs displayed in web page list 610 are organized in a hierarchical fashion. In a manner similar to the conventional hierarchical organization of documents or files within folders or directories, the present invention displays a hierarchical organization of web pages pages for a particular full list of web pages for a particular web site may be expanded and displayed in area 610 by selecting the boxed plus sign symbol provided in the preferred embodiment of the present invention.

Figure 7:
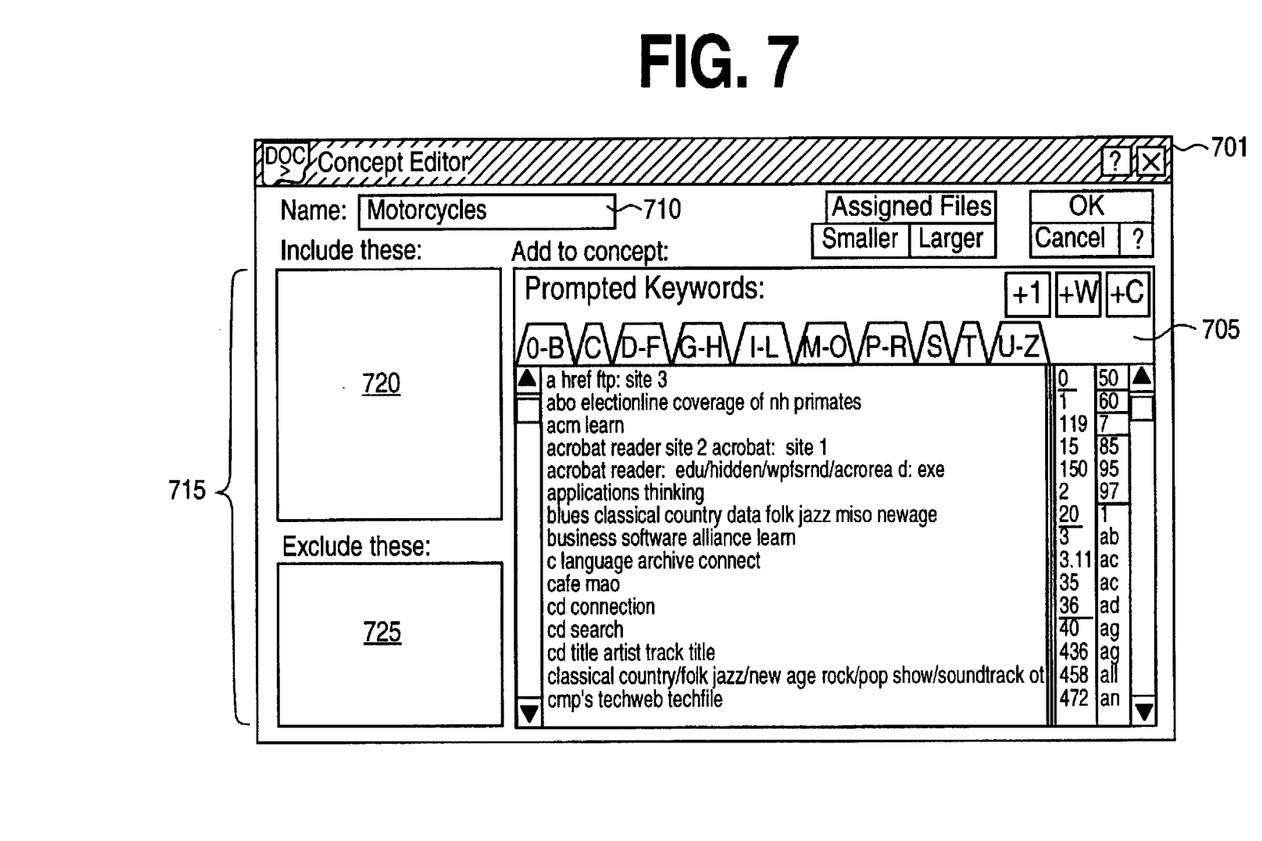
FIG. 7 depicts the preferred embodiment of the improved user-interface showing the concept editor of the present invention.

Referring now to FIG. 7, the present invention also includes a concept editor. The concept editor is used to create a hierarchy in the specification of search terms or key words and key phrases. Using the concept editor of the present invention, a set of related key words or key phrases may be grouped together under a single concept identifier. The concept identifier may then be used to specify a search for any of the related key words or key phrases that the concept identifier represents.

FIG. 7 illustrates a window 701 which is used to control the concept editor. Window 701 includes a keyword pane 705. Keyword pane 705, as described above, provides a means for displaying and indexing into a plurality of key words and key phrases associated with a collection of archive documents or WWW pages. Any one or more of these key words and key phrases may be selected, dragged, and dropped into other display areas using conventional means. Window 701 also includes a concept specification area 715 including an "include" area 720 and an "exclude" area 725. These areas are used for specifying the items included or excluded from the set of related key words or key phrases grouped together under a single concept identifier. These areas are used in the manner described below.

Window 701 also includes a dialog box 710 with which a user may enter the name of a concept identifier that represents the set of related key words or key phrases grouped together under the specified name. In the example of FIG. 7, a user has entered the concept identifier name "Motorcycles". The user may now drag and drop key words or key phrases from keyword pane 705 into either include area 720 or exclude area 725. In this example, it is anticipated that a user would drag and drop text items related to the concept identifier name "Motorcycles"—perhaps make/model information or specifications for specific types of motorcycles. Items dropped into area 720 will qualify a subsequent search to require matching text include one or more of these items. Items dropped into area 725 will qualify a subsequent search to require matching text not include any of these items. In this manner, a complex keyword query may be specified and represented by the concept identifier. In a subsequent search of archive documents or WWW pages, a user need only enter the concept identifier and the query it represents is automatically configured.

Concept identifiers may also be hierarchically created. A previously created concept identifier may be dragged and dropped into the specification area 715 of a subsequently created concept identifier. In this manner, the specification of a concept identifier may include other concept identifiers. For example, a user may create a concept identifier "Motor Vehicles". The previously created concept identifier "Motorcycles" may be dragged and dropped into area 720 when the concept identifier "Motor Vehicles" is created. Other key words, key phrases, or concept identifiers may be dragged and dropped in to area 715 as well. Concept identifiers may thereafter be dragged and dropped into search pane 240. Thus, a very complex and hierarchical query structure may be created using the concept editor of the present invention.

In addition, the concept editor of the present invention also allows the creation of logical expressions or query expressions which can include key words, key phrases, and other previously defined concept identifiers. The key words, key phrases, and other concept identifiers that define a concept identifier may be combined into a logical expression using "AND", "OR", and "NOT" operators. These operators are well known to those of ordinary skill in the art. The concept identifier may therefore be used to represent a logical expression. The concept identifier and the logical expression that it represents may be conveniently used for document search and query operations.

There are many applications for the concept identifier feature of the present invention. For example, one of the important features of the Internet is subscription to various alt.newsgroup services. A newsgroup subscriber receives periodic updates through electronic mail. The concept editor of the present invention may be used to create a compound concept identifier representing a logical expression that defines the particular newsgroup content of interest to a particular subscriber. Using this concept identifier, the subscriber may conveniently browse for his/her specific areas of interest or an automatic browse and capture function may be activated.

A method and apparatus for identifying one of a plurality of documents stored in a computer-readable medium by prompting a computer user to construct a query expression from an automatically generated list of keyword phrases is thus described.

What is claimed is:

1. A method for identifying one of a plurality of documents stored in a computer-readable medium, the method comprising the computer-implemented steps of:

automatically identifying for a user keyword phrases in the plurality of documents;

displaying a tabbed index indicative of content of the keyword phrases;

prompting the user to construct a query expression in which at least one of the keyword phrases is an operand; and identifying one of the plurality of documents based on the query expression.

2. The method of claim 1 wherein said step of displaying a tabbed index further includes a step of dynamically adjusting the symbols on said tabbed index based on the content of the keyword phrases.

3. The method of claim 2 wherein said step of dynamically adjusting the symbols on said tabbed index further includes a step of displaying at least one tab of said tabbed index with a plurality of symbols.

4. The method of claim 1 further including a step of displaying key words in a first display area and key phrases in a second display area.

5. The method of claim 4 wherein the width of said first display area and said second display area is dynamically adjusted based on the content of said first and second display areas.

6. The method of claim 1 further including a step of specifying a concept identifier to include one or more of said keyword phrases.

7. The method of claim 6 wherein said concept identifier represents said query expression.

8. A method for identifying one of a plurality of web pages stored on a WWW site, the method comprising the computer-implemented steps of:

automatically identifying for a user keyword phrases in the plurality of web pages;

displaying a tabbed index indicative of content of the keyword phrases;

prompting the user to construct a query expression in which at least one of the keyword phrases is an operand; and identifying one of the plurality of web pages based on the query expression.

9. The method of claim 8 wherein said step of displaying a tabbed index further includes a step of dynamically adjusting the symbols on said tabbed index based on the content of the keyword phrases.

10. The method of claim 9 wherein said step of dynamically adjusting the symbols on said tabbed index further includes a step of displaying at least one tab of said tabbed index with a plurality of symbols.

11. The method of claim 8 further including a step of displaying key words in a first display area and key phrases in a second display area.

12. The method of claim 11 wherein the width of said first display area and said second display area is dynamically adjusted based on the content of said first and second display areas.

13. The method of claim 8 further including a step of specifying a concept identifier to include one or more of said keyword phrases.

14. The method of claim 13 wherein said concept identifier represents said query expression.

15. An apparatus for identifying one of a plurality of documents stored in a computer-readable medium, the apparatus comprising:

means for automatically identifying for a user keyword phrases in the plurality of documents;

means for displaying a tabbed index indicative of content of the keyword phrases;

means for prompting the user to construct a query expression in which at least one of the keyword phrases is an operand; and means for identifying one of the plurality of documents based on the query expression.

16. The apparatus of claim 15 wherein said means for displaying a tabbed index further includes a means for dynamically adjusting the symbols on said tabbed index based on the content of the keyword phrases.

17. The apparatus of claim 16 wherein said means for dynamically adjusting the symbols on said tabbed index further includes a means for displaying at least one tab of said tabbed index with a plurality of symbols.

18. The apparatus of claim 15 further including a means for displaying key words in a first display area and key phrases in a second display area.

19. The apparatus of claim 18 further including means for dynamically adjusting the width of said first display area and said second display area based on the content of said first and second display areas.

20. The apparatus of claim 15 further including a means for specifying a concept identifier to include one or more of said keyword phrases.

21. The apparatus of claim 20 wherein said concept identifier represents said query expression.

* * * * *